(12) United States Patent
Stankowski et al.

(10) Patent No.: US 8,881,965 B2
(45) Date of Patent: Nov. 11, 2014

(54) BRAZE ALLOY FOR HIGH-TEMPERATURE BRAZING AND METHODS FOR REPAIRING OR PRODUCING COMPONENTS USING A BRAZE ALLOY

(75) Inventors: Alexander Stankowski, Würenlingen (CH); Daniel Beckel, Wettingen (CH)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 13/232,120

(22) Filed: Sep. 14, 2011

(65) Prior Publication Data
US 2013/0020377 A1   Jan. 24, 2013

(30) Foreign Application Priority Data

Jul. 19, 2011 (CH) .................................. 1203/11

(51) Int. Cl.
*B23K 31/02* (2006.01)
*B23P 6/00* (2006.01)
*B23K 1/00* (2006.01)
*B23K 35/30* (2006.01)
*B23K 35/02* (2006.01)
*C22C 19/03* (2006.01)
*C22C 19/07* (2006.01)
*F01D 5/00* (2006.01)

(52) U.S. Cl.
CPC ........... *B23K 1/0018* (2013.01); *B23K 35/3033* (2013.01); *B23K 35/3046* (2013.01); *B23P 6/00* (2013.01); *B23P 6/005* (2013.01); *B23K 35/0244* (2013.01); *C22C 19/03* (2013.01); *C22C 19/07* (2013.01); *F01D 5/005* (2013.01); *F05D 2230/238* (2013.01); *B23K 2201/001* (2013.01)
USPC ........................ 228/119; 228/248.1; 29/889.1

(58) Field of Classification Search
None
See application file for complete search history.

(56) References Cited

U.S. PATENT DOCUMENTS 4,381,944 A * 5/1983 Smith et al. ...................... 75/255
5,240,491 A * 8/1993 Budinger et al. ............... 75/255
(Continued)

FOREIGN PATENT DOCUMENTS

DE   10 2009 051 823     5/2011
EP            1258545    11/2002
(Continued)

OTHER PUBLICATIONS

Search Report for Swiss Patent App. No. 1203/2011 (Nov. 25, 2011).
(Continued)

*Primary Examiner* — Kiley Stoner
(74) *Attorney, Agent, or Firm* — Buchanan Ingersoll & Rooney PC

(57) ABSTRACT

In a Ni-based, Co-based, or Ni—Co-based braze alloy (1) for high-temperature brazing of components (7) of modular structure and for repairing damaged components (7) which are formed of single crystal or directionally solidified superalloys using said braze alloy (1), the braze alloy has a first metallic powder component (2) having particle sizes in the nanometer range and a second metallic powder component (3) having particle sizes in the micrometer range. The surface of the particles of the second powder component (3) is thinly coated with particles of the first powder component (2). The braze alloy (1) additionally includes grain boundary stabilizing elements as alloying elements. In addition, melting point depressants can be present in the braze alloy (1) in a commercially common quantity or with a considerably increased proportion. Both the melting temperature of the braze alloy (1) and the probability of recrystallization are advantageously reduced.

13 Claims, 3 Drawing Sheets

(56) References Cited

U.S. PATENT DOCUMENTS

| | | | |
|---|---|---|---|
| 5,806,751 A * | 9/1998 | Schaefer et al. | 228/119 |
| 5,965,197 A * | 10/1999 | Jin et al. | 427/180 |
| 6,050,477 A * | 4/2000 | Baumann et al. | 228/119 |
| 6,276,597 B1 * | 8/2001 | Budinger et al. | 228/225 |
| 6,283,356 B1 * | 9/2001 | Messelling | 228/119 |
| 6,348,081 B1 | 2/2002 | Horata et al. | |
| 6,464,128 B1 * | 10/2002 | Messelling et al. | 228/119 |
| 7,279,229 B2 * | 10/2007 | Budinger et al. | 428/557 |
| 2004/0050909 A1 * | 3/2004 | Renteria et al. | 228/119 |
| 2004/0050913 A1 | 3/2004 | Philip | |
| 2005/0109818 A1 * | 5/2005 | Shimohata et al. | 228/119 |
| 2008/0017694 A1 * | 1/2008 | Schnell et al. | 228/119 |
| 2008/0142575 A1 | 6/2008 | Cretegny | |
| 2008/0209726 A1 * | 9/2008 | Powers | 29/889.1 |
| 2009/0014505 A1 * | 1/2009 | Cretegny et al. | 228/248.1 |
| 2010/0032472 A1 * | 2/2010 | Heinecke et al. | 228/227 |
| 2011/0076147 A1 * | 3/2011 | Ganesh et al. | 416/204 R |

FOREIGN PATENT DOCUMENTS

| | | | |
|---|---|---|---|
| EP | 1759806 | | 3/2007 |
| EP | 1930116 | | 6/2008 |
| EP | 1949988 A | * | 7/2008 |
| EP | 1967313 | | 9/2008 |
| EP | 2062672 A | * | 5/2009 |
| JP | 2010-036199 | | 2/2010 |
| JP | 2011-054892 | | 3/2011 |
| WO | WO2008/095531 | | 8/2008 |

OTHER PUBLICATIONS

Search Report from EP Patent App. No. 12175439.4 (Oct. 15, 2012).

* cited by examiner

BRAZE ALLOY FOR HIGH-TEMPERATURE BRAZING AND METHODS FOR REPAIRING OR PRODUCING COMPONENTS USING A BRAZE ALLOY

This application claims priority to Swiss App. No. 01203/11, filed 19 Jul. 2011, the entirety of which is incorporated by reference herein.

BACKGROUND

1. Field of Endeavor

The invention concerns the field of materials science. It relates to a special braze alloy for high-temperature brazing and to a method for repairing damaged components, in particular gas turbine blades or vanes, which are formed of single crystal or directionally solidified superalloys using the braze alloy. The invention also relates to a method for connecting at least two component elements made of single crystal or directionally solidified superalloys for the purpose of producing or repairing components using the braze alloy.

2. Brief Description of the Related Art

At very high loading temperatures, single crystal or directionally solidified components made of superalloys, for example nickel-based, cobalt-based, or nickel-cobalt-based superalloys, have, inter alia, good material strength but also good corrosion resistance and good oxidation resistance as well as good creep strength. On account of this combination of properties, the intake temperature of the turbine can be increased greatly when using such, nevertheless very expensive, materials, e.g., in gas turbines, and therefore the efficiency of the plant increases. Operating temperatures in the hot gas range of above 1400° C. are therefore loading temperatures to which a large number of components of the gas turbine, e.g., guide vanes and rotor blades or combustion chamber liners, are exposed. In addition to these high thermal stresses, turbine rotor blades in particular are also subjected to high mechanical loading, for example. During operation of the turbine, this as a whole can lead to the creation of undesirable cracks in the material, and therefore components damaged in this way either have to be replaced by new parts or else repaired.

Since, as already mentioned above, the production of single crystal or directionally solidified new turbine components is extremely expensive, however, and is complicated in the case of large parts in terms of a sufficient material quality (continuous single crystal or directionally solidified structure), an attempt is usually made to repair the damaged component present, i.e., the functionality of the component should be restored by the repair and the repaired component should then be used again for a further maintenance period in the turbine.

Compared to the repair of damaged components having a conventional polycrystalline microstructure, however, the repair of damaged single crystal or directionally solidified gas turbine components is significantly more difficult, since the repaired regions of the single crystal or directionally solidified components should also have a corresponding single crystal or directionally solidified microstructure; otherwise, the properties are undesirably impaired in the repaired region.

It is known prior art (see, e.g., EP 1 258 545 B1) to repair damaged gas turbine components by using a brazing process, for example. In this case, a braze alloy is applied to the base material in the region of the material damage to the component, e.g., in the region of a crack, and introduced into the crack, and is then melted by the action of heat (the treatment temperature has to be greater than the melting temperature of the braze alloy but less than the melting temperature of the base material) and integrally bonded to the base material. Melting point depressants, in the case of EP 1 258 545 B1 1-3% by weight B, are usually added to the braze alloy in order to reduce the melting temperature thereof.

Compared to the welding processes for repairing damaged gas turbine components, which are likewise known but not described in more detail here, the brazing process has the advantage that the base material is not melted during the brazing and therefore the single crystal structure of the base material can remain intact.

Diffusion processes occur in the material during the heat treatment in the case of brazing, and these have the effect, inter alia, that the melting point depressants, such as boron, diffuse from the braze alloy into the surrounding base material. The braze alloy solidifies as a consequence of the reduction in the boron concentration, whereas the base material has an increased boron concentration in the region surrounding the braze alloy, which can disadvantageously lead to the precipitation of brittle borides.

Furthermore, it is also disadvantageous that the brazing material, in contrast to the base material, in many cases cannot have a single crystal or directionally solidified structure after the brazing on account of the major action of heat. This can be attributed, among other things, to the fact that the high-temperature-resistant superalloys used for gas turbine components also have to be brazed at very high temperatures. Depending on the level of the residual stresses within the region to be repaired, for example a crack, the probability of recrystallization along the surface of the crack is then very high. This applies in particular to the surfaces which are subjected to machining, for example grinding, sandblasting or shot peening, during the preparation process, before the brazing cycle.

As a result of recrystallization, grains are newly formed in the base material, i.e., firstly a single crystal or directionally solidified structure can no longer be ensured in the base material and secondly the newly formed grain boundaries are not stable. The brazing material also solidifies in an unordered polycrystalline structure and therefore disadvantageously has poorer properties than the single crystal or directionally solidified base material.

A polycrystalline structure in the brazing material and recrystallization in the base material can only be prevented if the brazing temperature can be kept low enough below a critical value.

It is known from EP 1 759 806 A1 and from U.S. Patent App. Pub. No. 2004/0050913 A1 to reduce the melting point of a braze alloy by reducing the particle size (to values in the nanometer range) of the braze alloy, which is suspended in a carrier liquid, but this is done with the aim of reducing the proportion of melting point depressants, e.g., B and Si, in the braze alloy or of removing these depressants entirely from the braze alloy, since they are disadvantageously responsible for the formation of brittle phases, which, inter alia, cause an undesirable loss of ductility of the material.

The effect achieved by the use of braze alloy powder in the nanometer size range is therefore utilized here for replacing the melting point depressants in the material. The reduction in the melting point of the particles in the nanometer size range is explained by the low activation energy for releasing atoms on the surface of a particle in the nanometer size range as compared to a larger particle. In addition, nanoparticles melt faster than powder particles in the micrometer range, since they have a very large surface-to-volume ratio. This technical solution has the disadvantage that, on account of the sole use of nanoparticles as the solid braze alloy component of the suspension, strong shrinkage occurs after the brazing and therefore the quality of the brazed joint needs to be improved.

As a further possibility for additionally reducing the melting temperature of the nanoparticles when repairing single crystal components made of superalloys by brazing, EP 1 759 806 A1 also indicates that it is possible to add melting point depressants, in particular boron, directly to the braze alloy suspension.

U.S. Patent App. Pub. No. 2004/0050913 A1 additionally discloses a braze alloy material for diffusion brazing, which is formed of a powder mixture of filler material particles in the nanometer size range (preferably between 10 and 100 nm) and of powder particles in the micrometer size range (preferably between 45 and 100 µm) in a carrier suspension. As already mentioned above, the nanoparticles melt at a temperature which lies significantly below the melting temperature of particles having a particle size in the micrometer range, and therefore that document again makes express reference to the fact that it is thus advantageously possible for the addition of melting point depressants, such as B or Si, to the braze alloy to be reduced considerably or for the addition of melting point depressants to be dispensed with entirely, and therefore the negative effects which the melting point depressants have on the resulting properties of the brazed joint can be minimized or eliminated completely. By reducing the proportion of melting point depressants, the proportion of additional grain boundary stabilizing elements, such as B, C, Hf, Re, and Zr, in the braze alloy is additionally also reduced.

U.S. Patent App. Pub. No. 2004/0050913 A1 also describes that the surface of the nanoparticles of the braze alloy can optionally be coated with a very thin layer of melting point depressants, such as B or Si, although the overall proportion of melting point depressants in the braze alloy is still significantly lower compared to the proportion according to the known prior art, which is emphasized as being an advantage in that document.

Furthermore, EP 1 930 116 A2 discloses a method for repairing a metallic component having a crack. In this method, first a nanoparticle alloy in the form of a powder, a foil, a suspension or a paste is introduced into the crack, and a filler alloy which is at least similar to the base material and has a particle size in the micrometer range is applied thereover and then subjected to a conventional diffusion brazing process. The nanoparticles preferably are formed of an Ni-, Co- or NiCo-based alloy, which preferably additionally includes at least one metal from the group consisting of Ti, Cr, Nb, Hf, Ta, Mo, W, Al, and Fe. By using these materials, it is possible to repair large cracks at relatively low brazing temperatures, this document likewise stating that it is an advantage that the content of melting point depressants can be reduced and the mechanical properties of the metallic component are thereby retained. This technical solution has the disadvantage that, on account of the sole use of nanoparticles in the crack, strong shrinkage occurs after the brazing and therefore the quality of the brazed joint would appear to need improvement.

Finally, EP 1 967 313 A1 describes a braze alloy for repairing turbine components which likewise includes two powder components, wherein the first component is a powder having particle sizes in the micrometer range (0.7-100 µm) and the second component is a powder having particle sizes in the nanometer range (less than or equal to 500 nm). According to an embodiment variant, the first component of the braze alloy, i.e., the powder having a particle size in the micrometer range, which is preferably an alloy, includes a melting point depressant, to be precise in particular only one melting point depressant from the following group: C, B, Hf, Si, Zr, Ti, and Ta. That document provides no information relating to the quantitative proportion of the melting point depressant in the composition of the first powder. The braze alloy can be applied to or into the damaged site in the form of a paste, a slurry, in pure powder form, or as a foil. The difference between the melting temperature of the braze alloy and the melting temperature of the base material should be as high as possible, at least 70° C.

WO2008/095531 A1 describes a braze alloy composition and a brazing method for superalloys. The braze alloy composition does not include any melting point depressants, but instead is formed of a base material, preferably nickel (or else MCrAlX), and at least one initial phase, preferably aluminum. A twofold heat treatment is carried out, with the first heat treatment being carried out at a temperature at which the initial phase (relatively small Al particles) melts but the base material (Ni) still does not. The initial phase then completely surrounds the relatively large Ni particles. The second heat treatment is then carried out above a temperature at which at least one resulting phase, here nickel aluminide, forms, the solidus temperature of which is higher than the solidus temperature of the initial phase. If the resulting phase after the second heat treatment has mechanical properties which approximate the mechanical properties of the base material, it is possible to bring about reliable joining, e.g., closure of a crack. Here, it is therefore possible to use only strictly limited specific braze alloy compositions which additionally depend greatly on the Al content.

SUMMARY

One of numerous aspects of the present invention involves providing a braze alloy for high-temperature brazing which is improved with respect to a braze alloy known from the prior art and an improved method for repairing components, in particular gas turbine blades or vanes, which consist of single crystal or directionally solidified superalloys using a braze alloy. It is also an object of the invention to specify a method for connecting at least two component elements for producing or repairing components of modular structure which consist of single crystal or directionally solidified superalloys using a braze alloy. It is likewise an object of the invention to join a replacement piece made of a single crystal or directionally solidified superalloy to a damaged component made of a single crystal or directionally solidified superalloy. The integral metallic joint should be made at relatively low brazing temperatures and recrystallization should be reliably prevented.

In another aspect, in the case of an Ni-based, Co-based or Ni—Co-based braze alloy, comprising a first metallic powder component having particle sizes in the nanometer range and a second metallic powder component having particle sizes in the micrometer range, this is achieved in that the surface of the particles of the second powder component is thinly coated with particles of the first powder component, and in that both powder components additionally comprise grain boundary stabilizing elements, preferably B, C, Hf, Re, Zr, as alloying elements.

With a braze alloy as described herein, it is advantageous that, on account of the nano size of the particles, the melting temperature is greatly reduced and as a result the probability of recrystallization in the adjoining base material is simultaneously reduced, and therefore the braze alloy can be used outstandingly for brazing single crystal or directionally solidified components. If, however, local recrystallization cannot be avoided in the base material during the brazing, the grain boundary stabilizing elements which are present mean that the grain boundaries are stabilized very effectively. The flow behavior of the braze alloy is very good. This ensures that cracks to be repaired are filled optimally with the braze alloy, for example.

In another aspect, in the case of a method for repairing components, in particular gas turbine blades or vanes, which consist of single crystal or directionally solidified nickel-based, cobalt-based, or nickel-cobalt-based superalloys and are damaged with at least one capillary crack, a braze alloy without filler particles is used, which is introduced into the crack, then the braze alloy is melted by simple heat treatment and cooled, such as to establish an integral bond between the braze alloy and the surrounding base material of the component, wherein the solidified braze alloy has the same single crystal or directional microstructure as the surrounding base material.

The simple brazing process (heat treatment without intermediate cooling to room temperature) and also the relatively low brazing temperature on account of the low melting temperature of the braze alloy are advantageous. There is only a small risk of recrystallization. Depending on the application, the braze alloy can be applied as a powder, as a suspension or as a paste. Since the particle size is in the nanometer range, small capillary-like cracks ($\leq 120$ μm) can be repaired outstandingly. This fits particularly well with single crystal or directionally solidified materials of gas turbine components, because cracks having widths of only a few micrometers but having a length of several millimeters, depending on the operating conditions typically occur there.

If wider cracks (e.g., a crack width of 250 μm) are brazed, there is scarcely any shrinkage because no pure nano braze alloy is used. Multiple applications of braze alloy with corresponding multiple heat treatments are not required. This method makes it possible to extend repairs of blades or vanes of thermal turbomachines to regions of greater loading with a minimal risk of recrystallization.

In yet another aspect, in the case of a method for producing or for repairing components of modular structure, in particular gas turbine blades or vanes, which consist of at least two component elements made of single crystal or directionally solidified nickel-based, cobalt-based, or nickel-cobalt-based superalloys, and the component elements have surfaces which lie face to face and are to be connected, a braze alloy without filler particles is used, which, after conventional, preceding mechanical preparation of the surfaces to be connected, is applied to at least one of the surfaces preferably in the form of a paste, then the surfaces of the component elements which are to be connected are joined to one another with an exact fit and pressed together to capillary gap width, and then the braze alloy is melted by simple heat treatment, i.e., without intermediate cooling to room temperature (RT), and cooled to RT, such as to establish an integral bond between the braze alloy and the surfaces of the component elements, wherein the solidified braze alloy has the same single crystal or directional microstructure as the surrounding base material.

A replacement piece made of a single crystal or directionally solidified superalloy can likewise be joined to a damaged component made of a single crystal or directionally solidified superalloy.

Here, too, it is of particular interest that only a simple brazing process is required and that the brazing temperature is relatively low on account of the low melting temperature of the braze alloy. There is only a small risk of recrystallization. Since the particle size is in the nanometer range, articles having small spacings/gaps ($\leq 120$ μm) can be connected.

If large filler particles and/or higher proportions of the filler particles are used in the braze alloy, however, larger spacings between the component elements can also be easily brazed, although this takes place without the formation of an epitaxial microstructure.

It is furthermore advantageous if the first and/or second metallic powder component of the braze alloy comprises at least one melting point depressant, to be precise preferably from the group consisting of B, Si, and P, and combinations thereof, in a content which is at least as high as in common, commercially available braze alloy compositions. An increased content of melting point depressants (up to twice as high as in common, commercially available braze alloy compositions, for example about 3 to 7% by weight B, up to 15% by weight Si, and up to 15% by weight P) is particularly advantageous here, because then the known effect of the relatively small particle size of the powder particles on the reduction in the melting temperature and the action of the melting point depressants are strengthened.

In one embodiment variant, the braze alloy can additionally comprise filler particles having a particle size in the range of 1-30 μm and a proportion in the overall mixture of 1 to 40% by weight. It is preferable for the particle size of the filler particles to be in the range of 1 to 15 μm and for the proportion of the filler particles in the overall mixture to be 5 to 20% by weight. It is then particularly advantageously possible to braze relatively wide cracks, and in addition it is possible, depending on the type and proportion of the filler material used, to influence the properties of the brazed region. However, the solidified braze alloy then does not necessarily have the same single crystal or directionally solidified microstructure as the surrounding base material.

In one embodiment, it is also possible for the surface of the filler particles to be thinly coated with particles of the first powder component. The coating of the particles of the second powder component and the coating of the filler particles with the particles of the first powder component are particularly advantageous if they comprise only one layer up to max. 10 layers of the particles of the first powder component, because they then partially melt very easily.

BRIEF DESCRIPTION OF THE DRAWINGS

The drawing shows an exemplary embodiment of the invention. Schematically.

DETAILED DESCRIPTION OF EXEMPLARY EMBODIMENTS

In the text which follows, the invention is explained in more detail on the basis of exemplary embodiments and the drawings.

Figure 1:
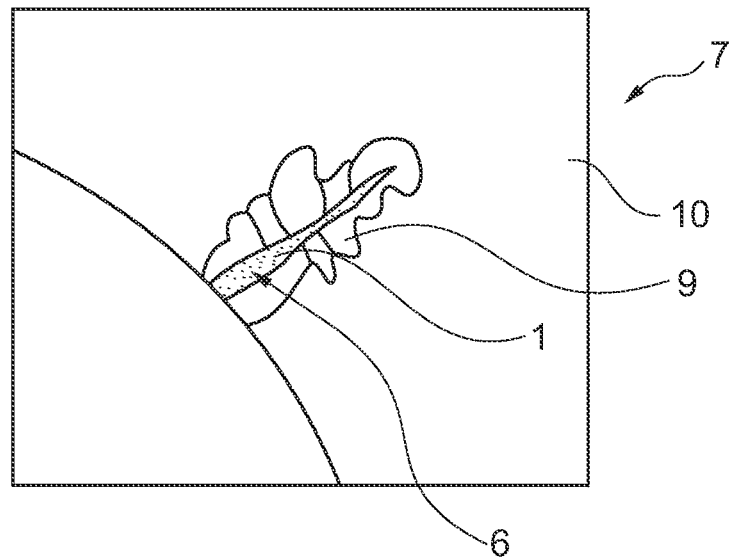
FIG. 1 shows a damaged region of a turbine blade or vane after a repair according to the prior art.

FIG. 1 schematically shows a damaged region 6, here a crack, of a component 7 after a conventional brazing repair method. In the present case, the component 7 is a gas turbine blade or vane made of a single crystal base material 10, to be precise, for example, CMSX4 (10% by weight Co, 6.5% by weight Cr, 6.5% by weight Ta, 6% by weight W, 5.6% by weight Al, 2.9% by weight Re, 1% by weight Ti, 0.6% by weight Mo, 0.1% by weight Hf, remainder Ni). The crack 6 was repaired using a conventional braze alloy 1 (18.5% by weight Cr, 18% by weight Fe, 5% by weight (Nb+Ta), 3% by weight Mo, 2.5% by weight B, 1% by weight Ti, remainder Ni; particle size between 44 and 125 µm). FIG. 1 clearly shows the recrystallization region 9 around the crack 6, where there is no longer a single crystal microstructure in the base material 10, i.e., here the properties of the base material 10 differ considerably from the high requirements.

Figure 2:
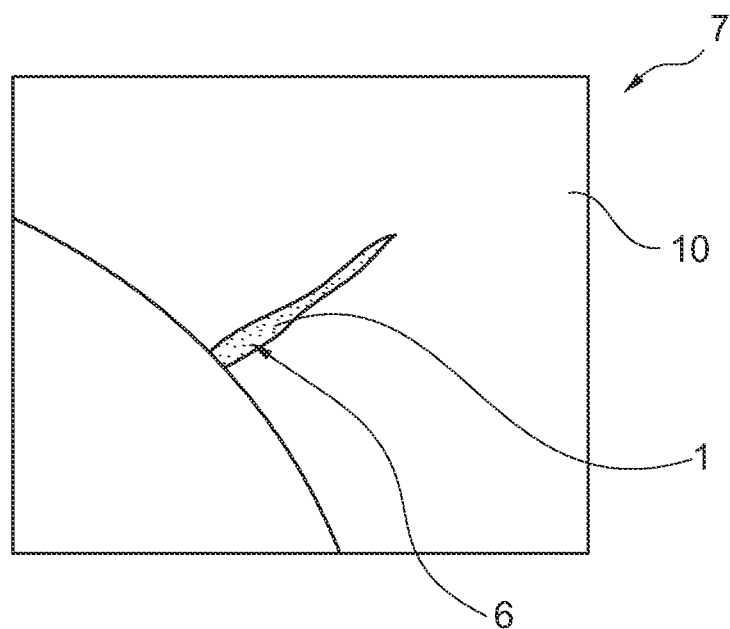
FIG. 2 shows a damaged region of a turbine blade or vane after a repair according to an exemplary embodiment of the present invention.

FIG. 2 schematically shows the damaged region 6 (crack) of the component 7 after the brazing repair method according principles of the present invention. As compared with FIG. 1, it can clearly be seen that the recrystallized region around the crack 6 is absent in the base material 10, i.e., the base material 10 also has a single crystal structure after the repair, i.e., after the crack 6 has been brazed up. The reason for this is explained in connection with FIG. 3.

Figure 3:
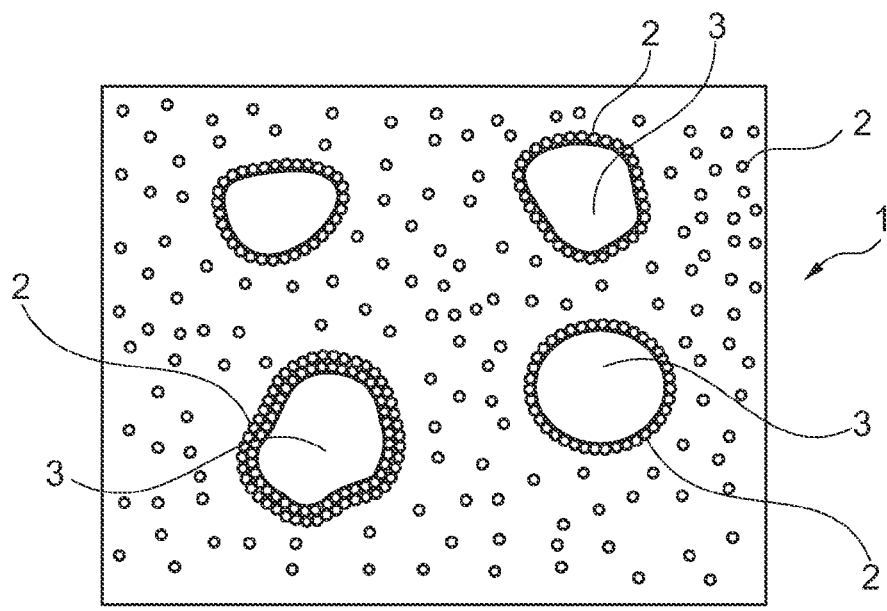
FIG. 3 shows a braze alloy according to the invention in a first embodiment variant.

FIG. 3 schematically shows the braze alloy 1 according to principles of the present invention in a first embodiment variant. The braze alloy 1 has a Ni-based, Co-based, or Ni—Co-based chemical composition and is suitable for high-temperature brazing. It includes a first metallic powder component 2 having particle sizes in the nanometer range (1-999 nm) and a second metallic powder component 3 having particle sizes in the micrometer range (1-999 µm). Within the context of the present invention, here metallic is comparable to alloy (Ni-based, Co-based, or Ni—Co-based). A braze alloy 1 according to principles of the present invention is distinguished by the fact that the surface of the particles of the second powder component 3 is thinly coated with particles of the first powder component 2, and that the braze alloy 1, i.e., both powder components 2 and 3, additionally include grain boundary stabilizing elements, for example B, C, Hf, Re, Zr, as alloying elements. Specifically, the following composition was used for the braze alloy 1 in this exemplary embodiment: 15% by weight Cr, 10% by weight Co, 5.5% by weight Al, 3% by weight Ta, 3% by weight B, 0.15% by weight Y, remainder Ni. In this case, the first metallic powder component 2 was present in the particle size range of 20-50 nm, whereas the second metallic powder component 3 was present in the particle size range of 10-25 µm.

With a braze alloy 1 embodying principles of the present invention, it is advantageous that, on account of the nanometer size of the particles, the melting temperature is greatly reduced and as a result the probability of recrystallization is simultaneously reduced, and therefore the braze alloy can be used outstandingly for brazing single crystal or directionally solidified components. If, however, local recrystallization cannot be avoided in the base material 10 during the brazing, the grain boundary stabilizing elements which are present mean that the grain boundaries are stabilized very effectively. The flow behavior of the braze alloy 1 is very good, and as a result even very narrow capillary cracks are filled optimally with the braze alloy.

It goes without saying that a braze alloy as described herein can also be used for the high-temperature brazing of conventionally cast components.

The first and/or second metallic powder component 2, 3 of the braze alloy 1 can additionally include at least one melting point depressant, in a content which is at least as high as in common, commercially available braze alloy compositions, preferably up to about twice as high. By way of example, the proportion can be about 3 to 7% by weight B, up to 15% by weight Si, and up to 15% by weight P.

The effect of the relatively small particle size of the powder particles on the reduction in the melting temperature and the action of the melting point depressants are then advantageously strengthened.

Figure 4:
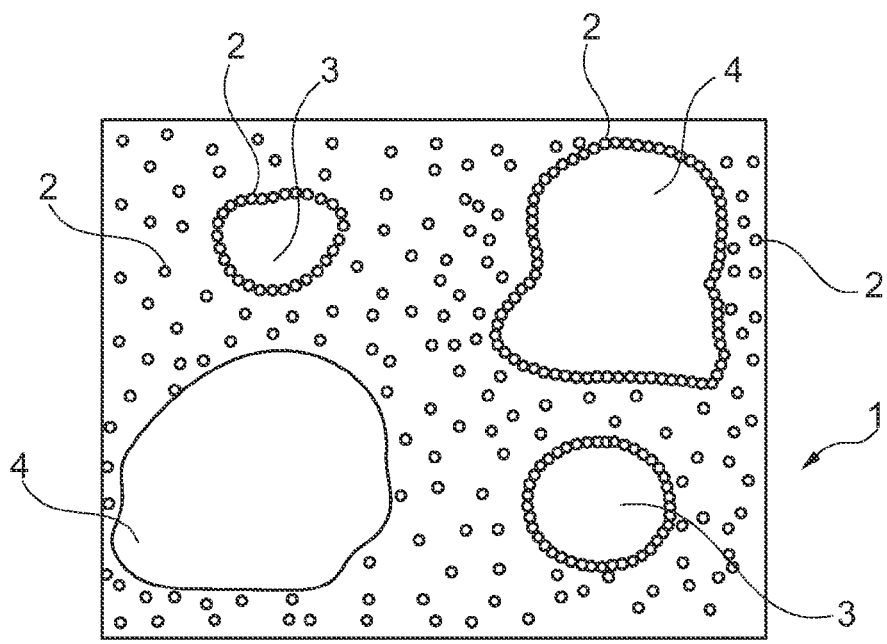
FIG. 4 shows a braze alloy according to the invention in a second embodiment variant.

FIG. 4 schematically shows the braze alloy 1 in a further embodiment variant. As compared to the variant shown in FIG. 3, here filler particles 4, which are formed of the base material 10 or of derivatives of the base material, are additionally present in the braze alloy 1. These filler particles 4 preferably have a particle size in the range of 1-30 µm and a proportion in the overall mixture of 1 to 40% by weight. It is advantageous for the particle size of the filler particles 4 to be in the range of 1 to 15 µm and for the proportion of the filler particles 4 in the overall mixture to be 5 to 20% by weight. It is thereby possible to braze particularly relatively wide cracks 6, and in addition it is possible, depending on the type and proportion of the filler material used, to influence the properties of the brazed region. However, on account of the large filler particles 4 which are present, it is therefore then to be expected that the braze alloy 1 no longer solidifies in single crystal form or directionally like the surrounding base material.

It is also possible for the surface of the filler particles 4 to be additionally thinly coated with particles of the first powder component 2 (see FIG. 4, on the right at the top). The coating of the particles of the second powder component 3 and the coating of the filler particles 4 with the particles of the first powder component 2 are particularly advantageous if they have only one layer, up to a maximum 10 layers, of the particles of the first powder component 2, because they then partially melt very easily.

If, by way of example, in a preferred exemplary embodiment a gas turbine blade or vane (component 7) made of a single crystal Ni-based superalloy is damaged as a result of a capillary crack (damaged region 6) which has arisen during operation, and has to be repaired, the damaged component 7 is repaired by using the braze alloy 1 (without filler particles 4). After a preceding, conventional cleaning of the damaged region 6, the braze alloy 1 is introduced into the capillary crack, is then melted by simple heat treatment (i.e., without intermediate cooling to RT), which proceeds in a plurality of stages, and finally cooled to RT, such as to establish an integral bond between the braze alloy 1 and the surrounding base material 10 of the component 7, wherein the solidified braze alloy 1 has the same single crystal or directional microstructure as the surrounding base material 10. The heat treatment used here (in a vacuum furnace) should be mentioned by way of example for the concept on which the method is based: the heating rate was 10-15° C./min, and at 400° C. the temperature was kept constant for 30 min in order to burn out the volatile components of the braze alloy paste. In order to ensure a uniform temperature distribution in the furnace, the temperature was likewise kept constant for 30 min at 930° C. The actual brazing operation was carried out at 1050° C. over the course of 20 min. The temperature was then reduced slowly (1-3° C./min) to 1000° C. and kept constant for 10 hours, in order to make directional or single crystal solidification possible. The temperature was subsequently cooled to room temperature rapidly (about 30° C./min).

The simple brazing process and also the relatively low brazing temperature, on account of the low melting temperature of the braze alloy 1, are advantageous. There is only a small risk of recrystallization in the base material 10, and possible grain boundaries are stabilized, if grain boundaries should in fact form. Depending on the application, the braze alloy 1 can be applied as a powder, as a suspension, or as a paste. Since the particle size is in the nanometer range, small capillary-like cracks (≤120 µm) can be repaired outstandingly. This fits particularly well with single crystal or directionally solidified materials of gas turbine components, because cracks having widths of only a few micrometers but having a length of several millimeters depending on the operating conditions typically occur there.

If wider cracks (e.g., a crack width of 250 µm) are brazed, there is scarcely any shrinkage if filler particles 4 having particle sizes in the micrometer range, which are larger than the particle sizes of the second metallic powder 3, are added to the braze alloy 1. However, the solidified braze alloy 1 then does not necessarily have the same single crystal or directionally solidified microstructure as the surrounding base material, but instead it will preferably solidify in polycrystalline form.

It is advantageous that multiple applications of braze alloy with corresponding multiple heat treatments are not required with a method according to principles of the present invention.

The braze alloys and methods described herein makes it possible to extend repairs of blades or vanes of thermal turbomachines to regions of greater loading with a minimal risk of recrystallization and with grain boundaries which possibly arise being stabilized.

Owing to the presence of the braze alloy powder in the nanometer particle size range and the melting point depressants, a metallic bond is achieved at relatively low temperatures. The diffusion of the melting point depressants from the metallic braze alloy powder particles stops during servicing of the gas turbine. Since the regions in which recrystallization starts are located on the surface of the component or at the flanks of the crack and have only small dimensions, the small diffusion path of the grain boundary stabilizing elements during the brazing cycle is sufficient to locally stabilize the grain boundaries, even if the diffusion from the relatively large braze alloy particles has not yet been completed during the heat treatment.

Figure 5:
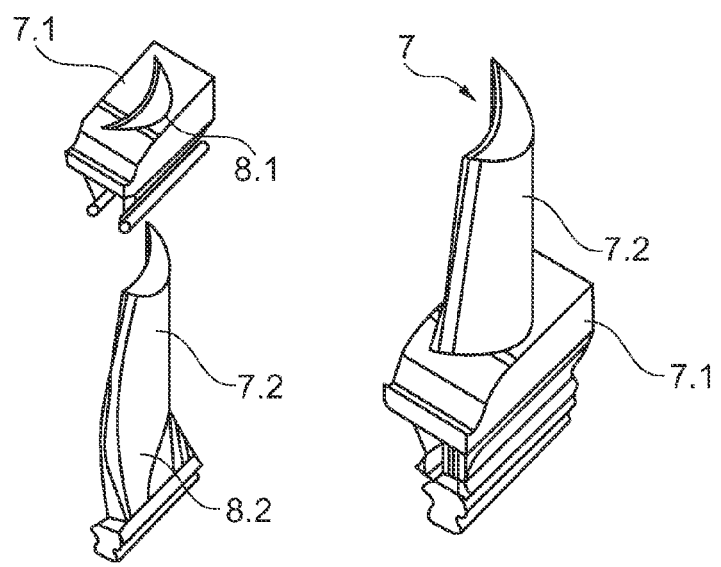
FIG. 5 shows a turbine blade or vane of modular structure according to an embodiment of the invention.

FIG. 5 shows a new turbine blade or vane of modular structure according to principles of the present invention as a further exemplary embodiment. The finished turbine blade or vane can be seen in the partial image on the right-hand side of FIG. 5. Since it is difficult and expensive to produce large single crystal components 7, there is also a need for new methods for producing components 7 of modular structure, in particular gas turbine blades or vanes, which are formed of at least two component elements 7.1, 7.2 made of single crystal or directionally solidified nickel-based, cobalt-based, or nickel-cobalt-based superalloys. According to the partial image on the left-hand side of FIG. 5, the component 7.1 is the blade or vane root, in which there is arranged an opening for receiving the component 7.2 (=main blade or vane part with the root portion missing in the component 7.1). The component elements 7.1, 7.2 have surfaces 8.1, 8.2 which lie face to face, are to be connected and are to be integrally bonded to one another faultlessly. Here, use is made of a braze alloy 1 as described herein without filler particles 4, which, after a conventional, preceding mechanical preparation of the surfaces 8.1, 8.2 to be connected, is applied, preferably in the form of a paste, to at least one of the surfaces 8.1, 8.2. The component element 7.1 is then pushed onto the component element 7.2 with an exact fit and, if appropriate, the two component elements 7.1, 7.2 are pressed against one another, such that only a maximum capillary gap width of about 120 µm is still present. Simple heat treatment is then carried out, during which the braze alloy 1 is melted and cooled to RT, such as to establish an integral bond between the braze alloy 1 and the surfaces 8.1, 8.2 of the component elements 7.1, 7.2, wherein the solidified braze alloy 1 has the same single crystal or directional microstructure as the surrounding base material 10.

Figure 6:
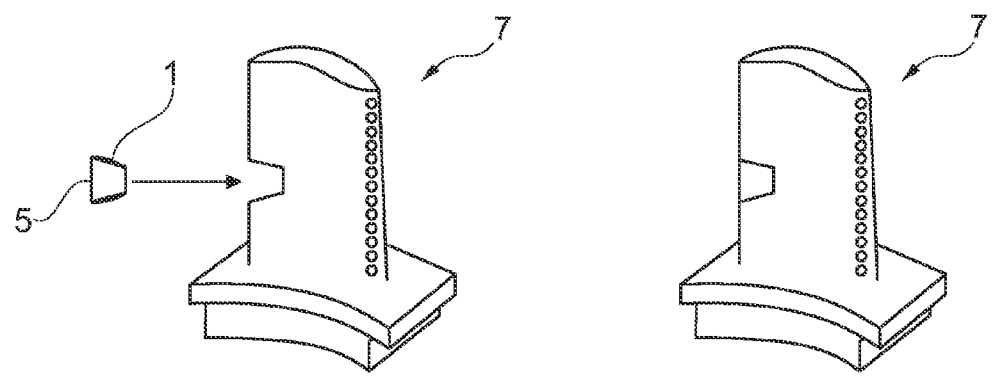
FIG. 6 shows a turbine blade or vane with a brazed insert according to an embodiment of the invention.

A replacement piece 5 made of a single crystal or directionally solidified superalloy can likewise be joined epitaxially to a damaged component 7 made of a single crystal or directionally solidified superalloy (see FIG. 6). After the damaged material has been separated from the component 7 and after conventional, preceding mechanical preparation of the surfaces of the component 7 and of the replacement piece 5 which are to be connected, a braze alloy 1 without filler particles 4 is applied in the form of a paste to at least one of the surfaces to be connected. In the present exemplary embodiment, these are the surfaces of the replacement piece 5. The replacement piece 5 is then inserted together with the applied braze alloy 1 into the component 7, here a gas turbine blade or vane, at that point where the damaged material was previously removed (see the arrow in the partial image on the left-hand side of FIG. 6) and, if appropriate, the replacement piece and the component are pressed against one another, such that only a maximum capillary gap width of about 120 µm is still present. The braze alloy 1 is then melted by simple multi-stage heat treatment (without intermediate cooling to RT). During subsequent cooling to RT, an integral bond is established between the braze alloy 1 and the surfaces of the component 7 and of the replacement piece 5, wherein the solidified braze alloy 1 has the same single crystal or directional microstructure as the surrounding base material. The repaired component 7 is shown in the partial image on the right-hand side of FIG. 6.

Here, too, it is particularly advantageous that only a simple brazing process is required and that the brazing temperature is relatively low on account of the low melting temperature of the braze alloy. There is only a small risk of recrystallization. Since the particle size is in the nanometer range, articles having small spacings/gaps (≤120 µm) can be connected outstandingly and to the best quality. If large filler particles are additionally used in the braze alloy and/or if a high proportion of filler particles is used, however, larger spacings between the component elements can also be easily brazed, although in this case epitaxial microstructures are not to be expected.

The general effect of the methods described herein, such as the reduction in the melting temperature of the braze alloy and the reduction in the probability of recrystallization, can also be achieved for other classes of braze alloy based on Ag, Cu and Al for brazing steels, Cu alloys and Al alloys.

LIST OF REFERENCE NUMERALS

1 Braze alloy
2 First metallic powder component (nanometer range)
3 Second metallic powder component (micrometer range)
4 Filler particles
5 Replacement piece
6 Damaged region, for example crack
7 Component
7.1; 7.2 Component element
8.1; 8.2 Surfaces which lie face to face and are to be connected
9 Recrystallization region
10 Base material While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A Ni-based, Co-based, or Ni—Co-based brazing mixture for high-temperature brazing, the brazing mixture comprising:
    a first metallic powder component including particles with sizes in the nanometer range;
    a second metallic powder component including particles with sizes in the micrometer range;
    wherein a surface of the particles of the second powder component is coated with particles of the first powder component;
    at least one grain boundary stabilizing element as an alloying element of the first and of the second metallic powder components;
    wherein the first powder component and the second powder component comprise boron from about 3 to 7% by weight as a melting point depressant; and
    wherein the brazing mixture includes filler particles having a particle size in the range of 1-30 μm and a proportion in the overall brazing mixture of 1 to 40% by weight.

2. The brazing mixture as claimed in claim 1, wherein said at least one grain boundary stabilizing element comprises at least one element from the group consisting of B, C, Hf, Re, and Zr.

3. The brazing mixture as claimed in claim 1, wherein the particle size of the filler particles is 1 to 15 μm.

4. The brazing mixture as claimed in claim 1, wherein the proportion of the filler particles in the overall brazing mixture is 5 to 20% by weight.

5. The brazing mixture as claimed in claim 1, wherein surfaces of the filler particles are coated with particles of the first powder component.

6. The brazing mixture as claimed in claim 5, wherein the coating of the particles of the second powder component and the coating of the filler particles with the particles of the first powder component comprise from one to 10 layers of the particles of the first powder component.

7. A method for repairing a component which consists of single crystal or directionally solidified nickel-based, cobalt-based, or nickel-cobalt-based superalloys as a base material and are damaged with at least one capillary crack at a damaged region, the method comprising:
    providing the brazing mixture as claimed in claim 1;
    introducing or applying the braze alloy to the damaged region;
    melting the brazing mixture, including heat treating the component and cooling the component to room temperature, said heat treating and cooling establishing an integral bond between the brazing mixture and surrounding base material of the component, and said heat treating and cooling being performed such that a solidified brazing mixture is formed which has the same single crystal or directionally solidified microstructure as surrounding base material.

8. The method as claimed in claim 7, wherein said component comprises a gas turbine blade or vane.

9. A method for producing or for repairing a modular component which has at least two component elements made of single crystal or directionally solidified nickel-based, cobalt-based, or nickel-cobalt-based superalloys as a base material, wherein the component elements have surfaces which lie face-to-face and are to be connected, the method comprising:
    providing the brazing mixture as claimed in claim 1;
    mechanically preparing said surfaces to be connected;
    applying the brazing mixture to at least one of said surfaces;
    joining said surfaces to one another with an exact fit, including pressing said surfaces together to a capillary gap width; and melting the brazing mixture including heat treating, and
    cooling the melted brazing mixture to room temperature to form a solidified brazing mixture, such that an integral bond between the brazing mixture and the surfaces of the component elements is established, wherein the solidified brazing mixture has the same single crystal or directionally solidified microstructure as surrounding base material.

10. The method as claimed in claim 9, wherein the modular component comprises gas turbine blades or vanes.

11. A method for repairing a component which consists of a single crystal or directionally solidified nickel-based, cobalt-based, or nickel-cobalt-based superalloy as a base material, with a replacement piece in the component to be repaired, wherein the replacement piece consists of a single crystal or directionally solidified nickel-based, cobalt-based, or nickel-cobalt-based superalloy as a base material, the method comprising:
    providing the brazing mixture as claimed in claim 1;
    mechanically preparing surfaces of the component and of the replacement piece which are to be connected; applying the brazing mixture in the form of a paste to at least one of the surfaces to be connected;
    introducing the replacement piece into the component and pressing in the replacement piece to a capillary gap width; and
    melting the brazing mixture including heat treating, and cooling the melted brazing mixture to room temperature to form a solidified brazing mixture, such that an integral bond between the brazing mixture and the surfaces of the component and of the replacement piece is established, wherein the solidified brazing mixture has the same single crystal or directionally solidified microstructure as surrounding base material.

12. The method as claimed in claim 11, wherein the component comprises a gas turbine blade or vane.

13. The brazing mixture as claimed in claim 1, wherein the first powder component, the second powder component, or both further comprises at least one additional melting point depressant selected from the group consisting of Si, P, and both; and
    wherein
    when said at least one melting point depressant comprises Si, the proportion of Si is up to 15% by weight, and
    when said at least one melting point depressant comprises P, the proportion of P is up to 15% by weight.

* * * * *